Patented May 19, 1953

2,639,370

UNITED STATES PATENT OFFICE 2,639,370

APPARATUS FOR EFFECTING INDICATION AND SIGNAL CONTROL BY TRANSIENT DIRECT CURRENT

Paul N. Martin, Penn Township, Allegheny County, Pa., assignor to Westinghouse Air Brake Company, a corporation of Pennsylvania Application September 20, 1946, Serial No. 698,354

18 Claims. (Cl. 246—219)

My invention relates to electrical control apparatus, and particularly to indication control apparatus and to signal control apparatus including apparatus for providing crossover protection for trains moving along railway tracks which are connected with each other by a crossover track through hand-operated track switches.

In order to save line conductor material, various means have been devised for employing any given pair of conductors for more than one electrical circuit. One of such means is the use of coded current.

A requisite for crossover protection apparatus is that it must be so arranged that a car or locomotive while occupying a crossover, such for example as one connecting two main tracks, while the switches are in the normal position for train movements along the main tracks, will cause a signal for each main track to indicate stop if the car or locomotive is within fouling distance of that main track. In crossover protection schemes embodying track circuits, one characteristic should therefore be high shunting sensitivity in order to insure that the crossover track circuits will be shunted if the crossover track has high contact resistance due to infrequency of train movements over the crossover.

One feature of my invention is the provision of means for producing transient direct current in the primary winding of a given transformer by starting or interrupting direct current which is flowing through a secondary winding of the same transformer. Transient direct current thus produced in the primary winding of a transformer can then be transmitted over a given pair of conductors for controlling indication or signal control apparatus, and at the same time the given pair of conductors can be in use for some other purpose.

I shall describe six forms of apparatus embodying my invention, and shall then point out the novel features thereof in claims.

Figure 1:
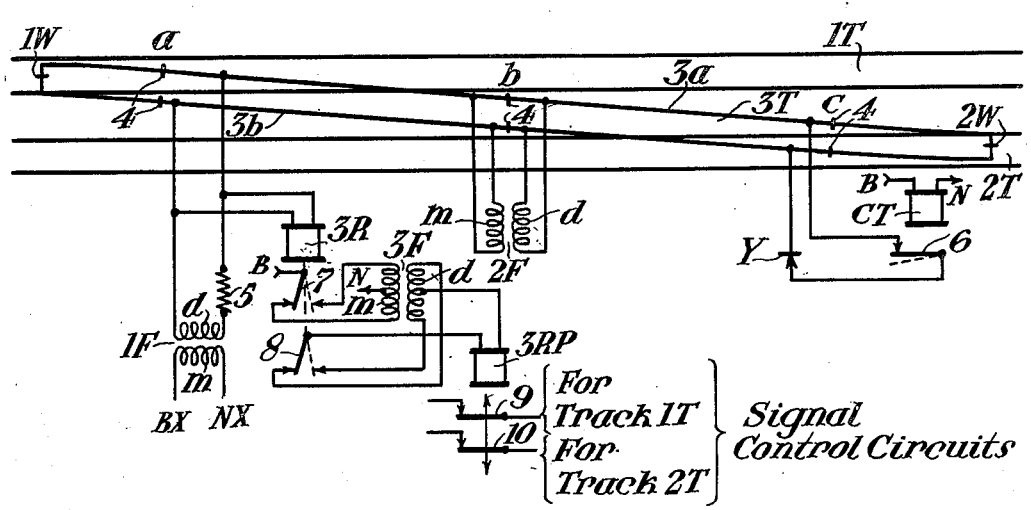
Figure 2:
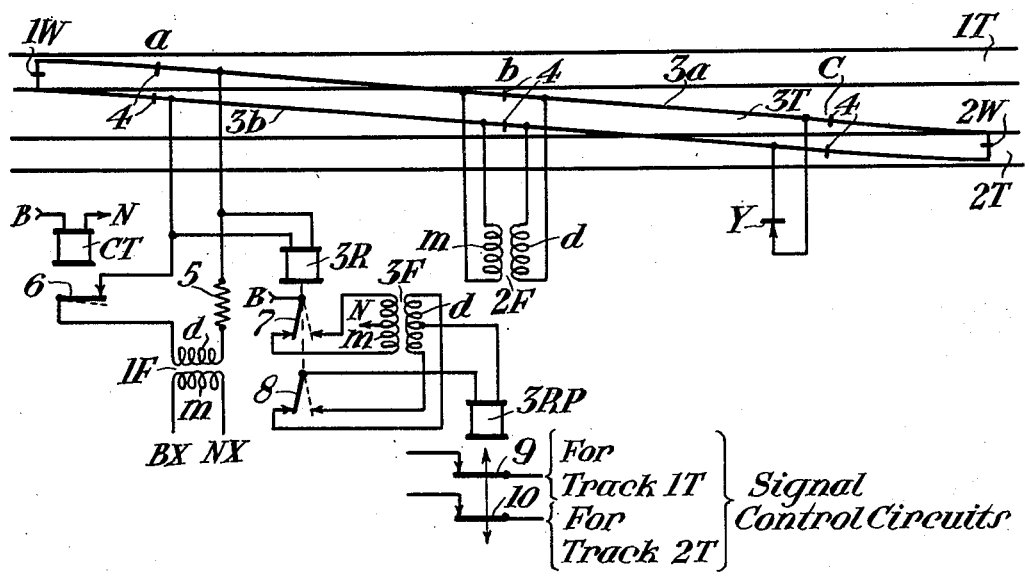
Figure 3:
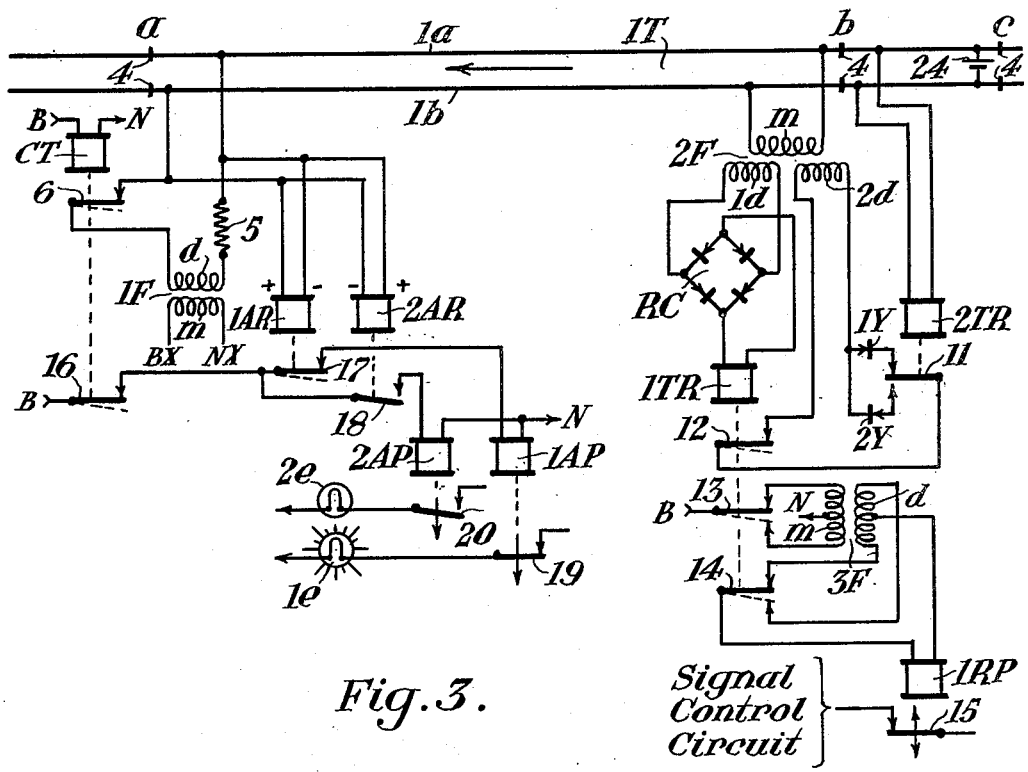
Figure 4:
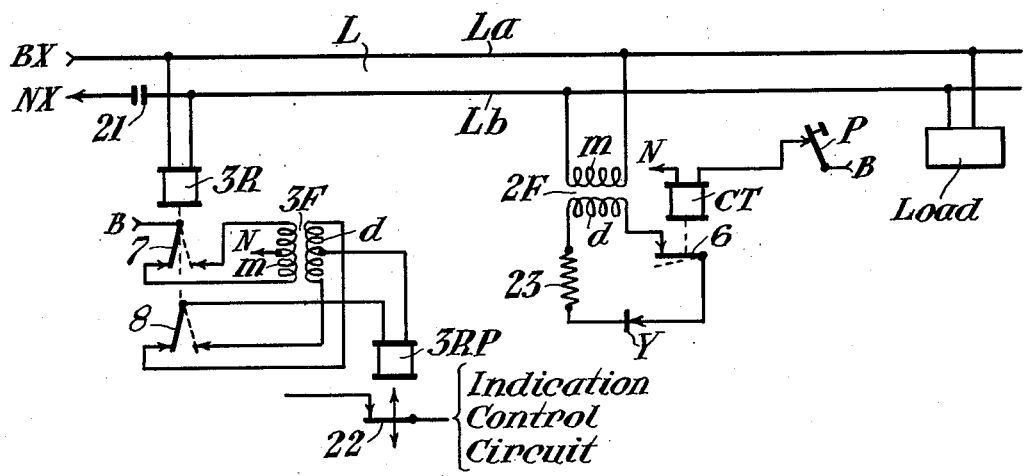
Figure 5:
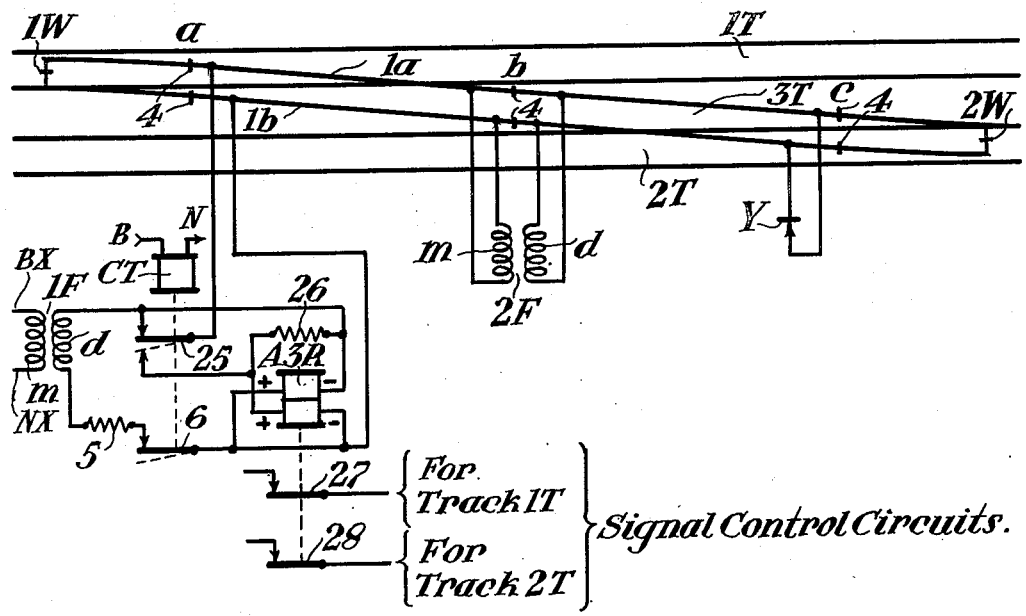
Figure 6:
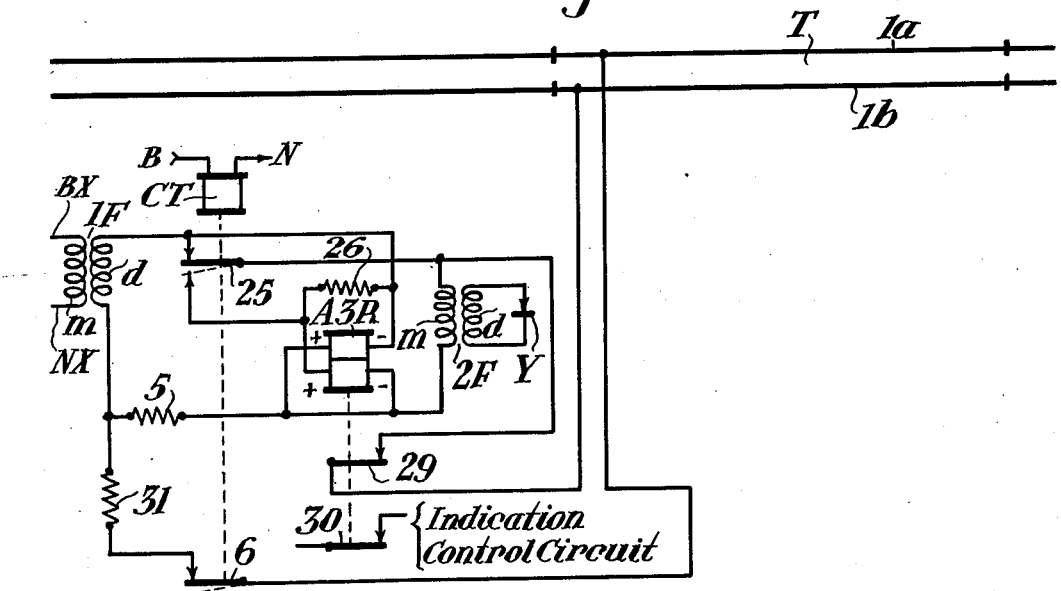

In the accompanying drawings, Fig. 1 is a diagrammatic view showing one form of apparatus embodying my invention, in which the primary circuit of a given transformer includes a suitable source of current and the rails of one portion of a crossover track, and the secondary circuit of the given transformer includes the rails of another portion of the same crossover track, and also includes an asymmetric unit and a contact of a coding device; Fig. 2 is a diagrammatic view showing a modified form of the apparatus of Fig. 1, in which a contact of a coding device is included in the primary circuit of the transformer instead of in the secondary circuit; Fig. 3 is a diagrammatic view showing a further modified form of the apparatus of Fig. 1, for providing reverse control or indication from the entrance end to the exit end of a section of railway track in which normal control is provided from the exit end to the entrance end; Fig. 4 is a diagrammatic view showing still another modification of the apparatus of Fig. 1, for controlling an electrical indication or control device over a power line or other control or indication circuit; Fig. 5 is a diagrammatic view showing a modification of the form of apparatus shown in Fig. 2, in which a neutral code detecting relay is used which does not follow code; and Fig. 6 is a diagrammatic view showing a modification of the form of apparatus shown in Fig. 5 in which the neutral code detecting relay is used to detect operation of a coding contact in an alternating current track circuit for controlling coded cab signals, for example.

Similar reference characters refer to similar parts in each of the views.

Referring first to Fig. 1 a stretch of railway is shown comprising two main tracks, designated by the reference characters 1T and 2T, connected with each other by a crossover track, designated by the reference character 3T, through hand-operated switches 1W and 2W. Track 3T is divided by means of insulated joints 4 into two sections $a$—$b$ and $b$—$c$.

Primary winding $m$ of a transformer 2F is connected across the rails of sectiton $a$—$b$ adjacent the insulated joints at $b$, and secondary winding $d$ of this transformer is connected across the rails of section $b$—$c$. A source of alternating current, shown as a secondary winding $d$ of a transformer 1F, is connected through an impedance 5, which may preferably be a resistor, across the rails of the opposite end of section $a$—$b$, adjacent the insulated joints at $a$. Primary winding $m$ of transformer 1F is energized from a suitable source having terminals BX and NX.

A code-following track relay of the polar stick type, designated by the reference character 3R, is connected in multiple with secondary winding $d$ of transformer 1F across the rails of section $a$—$b$. However, by use of a suitable winding on relay 3R, this relay could be operated in series with secondary winding $d$ of transformer 1F. A primary winding $m$, of a decoding transformer designated by the reference character 3F, is repeatedly energized alternately in opposite directions by current from a suitable source having terminals B and N controlled by contact 7 of relay 3R. The resulting alternating current generated in secondary winding $d$ of transformer 3F is rectified by contact 8 of relay 3R for energizing a slow pick-up and slow release code-detecting relay designated by the reference character 3RP. Signal control circuits for tracks 1T and 2T are controlled by contacts 9 and 10 operated by relay 3RP.

A contact 6 of a coding device CT is connected across the rails of section $b$—$c$ through an asymmetric unit Y adjacent the insulated joints at $c$. Coding device CT is connected directly with terminals B and N, and therefore contact 6 of coding device CT is repeatedly closed and opened.

Referring now to Fig. 2, the arrangement here shown is exactly as in Fig. 1 except that contact 6 of coding device CT is connected in series with secondary winding $d$ of transformer 1F instead of in series with asymmetric unit Y.

Referring next to Fig. 3, a stretch of railway track 1T is shown divided by insulated joints 4 into sections $a$—$b$ and $b$—$c$. Traffic normally moves over this track in the direction indicated by the arrow, and therefore I shall refer to the end of section $a$-$b$ at $b$ as the entrance end, and the opposite end at $a$ as the exit end.

Primary winding $m$ of a transformer 2F is connected across the rails at the entrance end of section $a$—$b$, and a source of alternating current shown as secondary winding $d$ of a transformer 1F is connected across the rails of the exit end of section $a$—$b$ through a usual impedance 5 and a contact 6 of a coding device CT. Primary winding $m$ of transformer 1F is energized from a source having terminals BX and NX. Coding device CT is constantly energized from a suitable source having terminals B and N, and therefore its contact 6 is repeatedly closing and opening the primary circuit for winding $m$ of transformer 2F.

Two code-following relays, designated by the reference characters 1AR and 2AR, respectively, of the biased polar type, are connected in multiple with each other and with secondary winding $d$ of transformer 1F across the rails of section $a$—$b$. Slow-release code-detecting relays 1AP and 2AP are controlled by contacts of relays 1AR and 2AR, respectively, and by a contact 16 of coding device CT. An indication device or any other suitable electrical device, such for example as lamps 1e and 2e, may be controlled by each of the relays 1AP and 2AP, respectively.

A secondary winding 1d of transformer 2F is connected through a rectifier, designated by the reference character RC, for energizing a code-following track relay 1TR. Contact 13 of relay 1TR, by repeatedly closing at its front and back points alternately, effects energization of primary winding $m$ of decoding transformer 3F from terminals B and N. Contact 14 of relay 1TR, through repeated closing of its front and back points alternately, effects rectification of the alternating current generated in secondary winding $d$ of transformer 3F for energizing a slow pick-up and slow release code-detecting relay 1RP. A signal control circuit may be controlled by contact 15 of relay 1RP.

Another secondary winding 2d of transformer 2F is included in a secondary circuit in which contact 12 of relay 1TR is in series with the front point of contact 11 of a track relay 2TR and an asymmetric unit 1Y, or is in series with the back point of contact 11 of relay 2TR and a second asymmetric unit 2Y. The selection between asymmetric units 1Y and 2Y may be effected in any other suitable manner. As here shown, relay 2TR is connected across the rails adjacent one end of section $b$—$c$, and is energized by a battery 24 connected across the rails adjacent the other end of section $b$—$c$.

Referring to Fig. 4, the conductors of a power line or other control or indication circuit L are shown energized from terminals BX and NX of an alternating current source for energizing a load which may be any suitable electrical device.

Primary winding $m$ of a transformer 2F is connected across the conductors of line L. A code-following relay 3R of the polar stick type is also connected across the conductors of line L. A transformer 3F and a slow pick-up slow release code-detecting relay 3RP are controlled by relay 3R similarly to the manner in which transformer 3F and relay 3RP, shown in Fig. 1, are controlled as already described. Any suitable electrical device or indication control circuit may be controlled by contact 22 of relay 3RP.

Secondary winding $d$ of transformer 2F is included in a secondary circuit in series with a contact 6 of a coding device CT, an asymmetric unit Y, and a suitable impedance 23. Coding device CT may be controlled in any suitable manner, such for example as by a manually controllable device P as shown in the drawing.

A suitable resistor or a low-reactance blocking condenser 21 may be required in one side of the line circuit L to prevent the alternating current source from shunting the direct current which energizes relay 3R.

Referring now to Fig. 5, the arrangement here shown is similar to that shown in Fig. 2 except that in Fig. 5 a neutral code detecting relay A3R, which does not follow code, is used instead of the polar code following relay 3R and the code-detecting transformer 3F and relay 3RP shown in Fig. 2. A resistor 26 is connected across the windings of relay A3R to make this relay slow releasing and also to protect contact 25 of coding device CT against arcing.

Referring finally to Fig. 6, a neutral code-detecting relay A3R such as is shown in Fig. 5 is here used merely to detect that contact 25 of coding device CT is operating in a circuit, such for example as a track circuit for coded cab signaling. In the event of failure of coding device CT to operate, relay A3R would become deenergized and would open the track circuit.

The asymmetric units shown in the drawings may be of the well-known half-wave copper oxide rectifier type.

As is well recognized, track circuits in which the current is periodically interrupted, as shown in Figs. 1, 2, 3, 5 and 6, inherently have high shunting sensitivity.

Having described, in general, the arrangement and operation of the apparatus, I shall now describe its operation more in detail.

As shown in Figs. 1, 2, 3, 5 and 6 of the drawings, all parts are in the normal condition and, as shown in Fig. 4, all parts are in the condition in which the manually controllable contact P is closed; primary winding $m$ of each of the transformers 2F is energized; secondary winding $d$ of each of these transformers is supplying only half-wave direct current to its secondary circuit because of being in series with an asymmetric unit Y; this current in the secondary circuit of transformer 2F is being periodically started and interrupted by a coding contact in the secondary circuit of the transformer 2F in Figs. 1 and 4, and by a coding contact in the primary circuit of transformer 2F in Figs. 2, 3, 5 and 6; each time the direct current is started in the secondary winding of any of the transformers 2F, a direct current transient voltage of a given polarity is produced in its primary winding, and each time the direct current is interrupted in the secondary winding of any one of the transformers 2F, a direct current transient voltage of the opposite polarity is produced in its primary winding; each of the relays 3R is operating its contacts between the normal and the reverse position in response to the transient direct current of opposite polarities; each relay 3RP is therefore energized; with contact 11 of relay 2TR closed at its front point, relay 1AR in Fig. 3 closes its contact each time the direct current is started in the secondary circuit which includes secondary winding 2d of transformer 2F, and relay 2AR closes its contact each time this current is interrupted by the opening of contact 6 of coding device CT; relay 1TR in Fig. 3 is energized each time contact 6 of coding device CT is closed; relays 1AP, 2TR and 1RP in Fig. 3 are energized; lamp 1e is lighted; each time when coding device CT, shown in Figs. 5 and 6, closes its front contacts, the upper winding of relay A3R, as shown in the drawing, is energized, in a direction to close its front contacts, by transient direct current of a given polarity produced in primary winding m of transformer 2F; and each time when coding device CT, shown in Figs. 5 and 6, closes its back contacts, the lower winding of relay A3R is energized, in a direction to retain the front contacts of relay A3R closed, by transient direct current of the opposite polarity produced in primary winding m of transformer 2F.

In the form of apparatus shown in Fig. 1, the primary circuit for transformer 2F passes from secondary winding d of transformer 1F, through impedance 5, rail 3a of section a—b, winding m of transformer 2F, and rail 3b of section a—b back to secondary winding d of transformer 1F. The secondary circuit for transformer 2F passes from secondary winding d of transformer 2F, through rail 3a of section b—c, contact 6 of coding device CT, asymmetric unit Y, and rail 3b of section b—c back to winding d of transformer 2F.

Relay 3R is energized by transient direct current of alternately normal and reverse polarities in a circuit passing from primary winding m of transformer 2F, through rail 3a of section a—b, winding of relay 3R, and rail 3b of section a—b back to primary winding m of transformer 2F. Each time contact 6 of coding device CT closes, transient direct current of a given polarity is produced in the circuit of primary winding m of transformer 2F for energizing relay 3R, and each time contact 6 of coding device CT opens, transient direct current of the opposite polarity is supplied from primary winding m of transformer 2F for energizing relay 3R.

Relay 3R operates its contacts 7 and 8 between normal and reverse positions in response to the transient direct current of alternately normal and reverse polarities. As already stated, transformer 3F is energized in response to operation of contact 7 of relay 3R between its normal and reverse positions, and the alternating current generated in winding d of transformer 3F is rectified by contact 8 of relay 3R for energizing relay 3RP. Contacts 9 and 10 of relay 3RP may be included in signal control circuits for tracks 1T and 2T, as shown in the drawing.

When a train enters section a—b, the current from secondary winding d of transformer 1F will be shunted through the wheels and axles of the train, and hence transformer 2F will be deenergized and no current will flow in secondary winding d of transformer 2F. Therefore no transient direct current will be produced, and hence relay 3R will retain its contacts 7 and 8 in the position to which they were last previously operated. No current will be generated in secondary winding d of transformer 3F, and hence relay 3RP will become deenergized and open the signal control circuits. When section b—c is occupied by a train, alternating current from secondary winding d of transformer 2F will be shunted through the wheels and axles of the train, and therefore no direct current will flow from secondary winding d of transformer 2F, and hence relay 3R will again become inoperative, causing relay 3RP to become deenergized and open the signal control circuits.

In the modified form of the apparatus shown in Fig. 2, the primary circuit for transformer 2F is the same as shown in Fig. 1 except that it includes, in addition, contact 6 of coding device CT. The secondary circuit for transformer 2F is the same as in Fig. 1 except that contact 6 of coding device CT is omitted.

In Fig. 2, each time contact 6 of coding device CT closes the primary circuit for transformer 2F, direct current is started in the secondary circuit of this transformer, and each time contact 6 opens the primary circuit for transformer 2F, direct current is interrupted in the secondary circuit of this transformer. Relay 3R, therefore, operates its contacts between normal and reverse positions, as described for Fig. 1, causing transformer 3F to energize relay 3RP which closes the signal control circuits as already described for Fig. 1.

In Fig. 3, the primary circuit including winding m of transformer 2F passes from secondary winding d of transformer 1F, through impedance 5, rail 1a of section a—b, primary winding m of transformer 2F, rail 1b of section a—b, and contact 6 of coding device CT back to secondary winding d of transformer 1F. The secondary circuit which includes secondary winding 1d of transformer 2F energizes relay 1TR through a rectifier RC which may be of the well-known copper oxide type.

Each time contact 6 of coding device CT opens the primary circuit including winding m of transformer 2F, contacts 12, 13 and 14 of relay 1TR open at their front points, and contacts 13 and 14 become closed at their back points. Each time contact 6 closes the primary circuit for winding m of transformer 2F, contacts 12, 13 and 14 close at their front points. The closing of contact 13 at its front and back points effects energization of primary winding m of transformer 3F alternately in opposite directions. The alternating current thus generated in secondary winding d of transformer 3F is rectified by operation of contact 14 to its front and back points for energizing code detecting relay 1RP, contact 15 of which may be included in a signal control circuit.

With relay 2TR energized, as shown in the drawing, the secondary circuit, including winding 2d of transformer 2F, passes from winding 2d, through asymmetric unit 1Y, front point of contact 11 of relay 2TR, and contact 12 of relay 1TR back to winding 2d. Each time contact 6 of coding device CT becomes closed while the front point of contact 11 of relay 2TR is closed, relay 1AR becomes energized by transient direct current generated in primary winding $m$ of transformer 2F, passing from primary winding $m$, through rail 1b of section a—b, winding of relay 1AR, and rail 1a of section a—b back to winding $m$.

With relay 1AR energized while the contacts of coding device CT are closed, relay 1AP becomes energized by a circuit passing from terminal B, through contact 16 of coding device CT, contact 17 of relay 1AR, and the winding of relay 1AP to terminal N. With relay 1AP energized, contact 19 of this relay becomes closed in the circuit for energizing indication device 1e. Each time when contact 6 of coding device CT opens while relay 2TR is energized, relay 2AR becomes energized by transient current, but at this time, contact 16 of coding device CT is also open, and hence relay 2AP does not become energized.

If a train should enter section 1T, primary winding $m$ of transformer 2F would become deenergized, and hence no direct current would be generated in secondary winding 2d of transformer 2F. Relay 1AR being responsive only to direct current would therefore become deenergized, causing relay 1AP to also become deenergized and indication device 1e to become deenergized.

If relay 2TR becomes deenergized, then each time when contact 6 of coding device CT closes, direct current will flow in the opposite direction through secondary winding 2d of transformer 2F in a circuit which includes asymmetric unit 2Y and the back point of contact 11 of relay 2TR. Transient direct current will then be generated in primary winding $m$ of transformer 2F of the polarity for energizing relay 2AR for closing its contact 18, thereby causing relay 2AP and lamp 2e to become energized. Relay 1AR now closes its contact 17 each time contact 6 of coding device CT opens, but since contact 16 of coding device CT is also open at this time, relay 1AP remains deenergized.

In Fig. 4, the primary circuit including primary winding $m$ of transformer 2F passes from terminal BX, through conductor La of circuit L, winding $m$ of transformer 2F, conductor Lb of circuit L, and condenser 21 to terminal NX. If contact P is closed as shown in the drawing, coding device CT will be energized by an obvious circuit, causing its contact 6 to repeatedly close and open. This operation of contact 6 of coding device CT in the secondary circuit for transformer 2F causes transient direct current of opposite polarities to be generated in primary winding $m$ of transformer 2F, as previously described. The secondary circuit including secondary winding $d$ of transformer 2F passes from winding $d$, through contact 6 of coding device CT, asymmetric unit Y, and impedance 23 back to winding $d$.

Transformer 3F becomes energized in response to operation of contact 7 of relay 3R, and energizes relay 3RP, as described for Fig. 1. With relay 3RP energized, its contact 22 is closed in an indication control circuit.

In Fig. 5, the primary circuit including winding $m$ of transformer 2F passes from secondary winding $d$ of transformer 1F, through impedance 5, contact 6 of coding device CT, rail 1b of section a—b, primary winding $m$ of transformer 2F, rail 1a of section a—b, and front point of contact 25 of coding device CT back to secondary winding $d$ of transformer 1F. The secondary circuit which includes secondary winding $d$ of transformer 2F is similar to that already described for Fig. 2.

Each time when contact 25 of coding device CT becomes closed at its front point, the upper winding of relay A3R, as shown in the drawing, becomes energized by transient direct current of a given polarity passing from primary winding $m$ of transformer 2F, through rail 1b of section a—b, upper winding of relay A3R, front point of contact 25 of coding device CT, and rail 1a of section a—b back to winding $m$ of transformer 2F. Each time when contact 25 of coding device CT becomes closed at its back point, the lower winding of relay A3R becomes energized by transient direct current of the opposite polarity passing from primary winding $m$ of transformer 2F, through rail 1a of section a—b, back point of contact 25 of coding device CT, lower winding of relay A3R, and rail 1b of section a—b back to winding $m$ of transformer 2F. With relay A3R thus energized, its contacts 27 and 28 will be closed in signal control circuits for tracks 1T and 2T, respectively.

When a train moves over track 3T, the transient direct current will be discontinued as already described for Fig. 1, causing relay A3R to become deenergized and open its contacts 27 and 28 in signal control circuits for tracks 1T and 2T.

In Fig. 6, coded cab signaling track circuit current passes from secondary winding $d$ of transformer 1F through impedance 31, contact 6 of coding device CT, rail 1a of track T, and from rail 1b of track T, through contact 29 of relay A3R, and front point of contact 25 of coding device CT to winding $d$ of transformer 1F.

The circuit by which primary winding $m$ of transformer 2F is periodically energized passes from secondary winding $d$ of transformer 1F, through impedance 5, winding $m$ of transformer 2F, and front point of contact 25 of coding device CT back to winding $d$ of transformer 1F.

Each time when contact 25 of coding device CT closes at its front point, the upper winding of relay A3R becomes energized by transient direct current of a given polarity passing from primary winding $m$ of transformer 2F, through the upper winding of relay A3R, and front point of contact 25 of coding device CT back to primary winding $m$ of transformer 2F. Each time when contact 25 of coding device CT becomes closed at its back point, the lower winding of relay A3R becomes energized by transient direct current of the opposite polarity passing from primary winding $m$ of transformer 2F, through the back point of contact 25 of coding device CT, and the lower winding of relay A3R back to winding $m$ of transformer 2F. If contact 25 of coding device CT should fail to operate, the transient direct current will be discontinued, causing relay A3R to become deenergized and open its contacts 29 and 30 in the track circuit and in an indication control circuit, respectively.

Although I have herein shown and described only six forms of apparatus embodying my invention, it is understood that various changes and modifications may be made therein within the scope of the appended claims without departing from the spirit and scope of my invention.

Having thus described my invention, what I claim is:

1. In combination, a transformer having a primary winding and a secondary winding, an asymmetric unit, a secondary circuit including said secondary winding and said asymmetric unit, a source of alternating current energy, a direct current code following device, a primary circuit for energizing said primary winding from said source with said code following device connected in multiple with said source, means for interrupting the current in said secondary circuit for effecting operation of said code following device, and indication means controlled by said code following device.

2. In combination, a transformer having a primary winding and a secondary winding, an asymmetric unit, a secondary circuit including said secondary winding and said asymmetric unit, a source of alternating current energy, a direct current code following device, a primary circuit for energizing said primary winding from said source with said code following device connected in multiple with said source, means for effecting building up of the current in said secondary circuit from zero for effecting operation of said code following device, and indication means controlled by said code following device.

3. In combination, a transformer having a primary winding and a secondary winding, an asymmetric unit, a secondary circuit including said secondary winding and said asymmetric unit, a source of alternating current energy, a direct current device, a primary circuit for energizing said primary winding from said source with said direct current device connected in multiple with said source, means for coding the current in said secondary circuit for effecting operation of said direct current device, and indication means controlled by said direct current device.

4. In electrical control apparatus, the combination comprising, a transformer having a primary winding and a secondary winding, an asymmetric unit, a contact, means for periodically closing and opening said contact, a secondary circuit including said secondary winding and said asymmetric unit and also said contact all in series, a source of alternating current, a direct current code following device, and a primary circuit for energizing said primary winding from said source with said code following device connected in multiple with said source.

5. In electrical control apparatus, the combination comprising, a transformer having a primary winding and a secondary winding, an asymmetric unit, said asymmetric unit passing current of a given polarity through said secondary winding but obstructing the flow of current of opposite polarity through said secondary winding so that a direct current component is produced in said secondary winding, a contact, means for periodically closing and opening said contact, a secondary circuit including said secondary winding and said asymmetric unit, a source of alternating current, a direct current code following device, and a primary circuit for energizing said primary winding from said source through said contact with said code following device connected in multiple with the portion of said primary circuit which includes said contact and said source.

6. In traffic protection apparatus in which a stretch of railway track is divided into two sections insulated from each other, the combination comprising, a transformer having a primary winding connected across the rails of one of said sections and having a secondary winding connected across the rails of the other of said sections, an asymmetric unit also connected across the rails of said other section, a coding device, means controlled by said coding device for periodically interrupting the current flowing from said secondary winding through said asymmetric unit, a source of alternating current, and a code following relay connected in multiple with said source across the rails of said one section.

7. In a railway signaling system, the combination comprising, a section of railway track, a source of alternating current connected across the rails of said section, coding means for periodically disconnecting said source from said section, a code following device connected across the rails of said section, a transformer having a primary winding and two secondary windings and with said primary winding connected across the rails of said section, a second code following device controlled by current from one of said secondary windings, an asymmetric unit, and a circuit including the other secondary winding and said asymmetric unit and controlled by said second code following device.

8. In a railway signaling system, the combination comprising, a section of railway track, a source of alternating current connected across the rails of said section, coding means for periodically disconnecting said source from said section, normal and reverse code-following means connected across the rails of said section, a transformer having a primary winding and a secondary winding and with said primary winding connected across the rails of said section, a first and a second asymmetric unit, and means for at times including said first asymmetric unit in a circuit for passing current in a given direction from said secondary winding and for at other times including said second asymmetric unit for passing current in the opposite direction from said secondary winding for effecting operation of said normal and reverse code-following means.

9. In combination, a transformer having a primary winding and a secondary winding, a primary circuit including a source of alternating current and said primary winding, means for starting and interrupting direct current through said secondary winding and thereby producing transient direct current in said primary circuit, and electrical apparatus controlled by said transient direct current in said primary circuit.

10. In combination, a transformer having a primary winding and a secondary winding, a primary circuit including a source of alternating current and said primary winding, an asymmetric unit, a secondary circuit including said secondary winding and said asymmetric unit, means for starting and interrupting the direct current in said secondary circuit controlled by said asymmetric unit and thereby producing transient direct current in said primary circuit, and electrical apparatus controlled by said transient direct current in said primary circuit.

11. In combination, a transformer having a primary winding and a secondary winding, an asymmetric unit, a secondary circuit including said secondary winding and said asymmetric unit, a source of alternating current energy, direct current means, a primary circuit for energizing said primary winding from said source, means for coding the current in said secondary circuit for producing transient direct current in said primary winding for operating said direct current means, and indication means controlled by said direct current means.

12. In combination, a transformer having a primary winding and a secondary winding, a primary circuit including a source of alternating current and said primary winding, means for obstructing the flow of current controlled by one-half of the alternating voltage wave generated in said secondary winding, means for coding the direct current in said secondary winding to produce transient direct current in said primary winding, and electrical apparatus controlled by said transient direct current.

13. In combination, a transformer having a primary winding and a secondary winding, a primary circuit including a source of alternating current and said primary winding, means for passing current of only one polarity, a secondary circuit including said secondary winding and said means for passing current of only one polarity, means for coding the direct current thus produced in said secondary circuit and thereby producing transient direct current in said primary circuit, and electrical apparatus controlled by said transient direct current.

14. In combination, a transformer having a primary winding and a secondary winding, a primary circuit including a source of alternating current and said primary winding, means for passing current of only one polarity, a secondary circuit including said secondary winding and said means for passing current of only one polarity, means for periodically interrupting the direct current thus produced in said secondary circuit and thereby producing transient direct current in said primary circuit of a given polarity when said direct current in said secondary circuit is interrupted and of the opposite polarity when said direct current is again started in said secondary circuit, a direct current neutral relay having two control windings so connected with said primary circuit that one of said windings is energized by said transient direct current of said given polarity and the other is energized by said transient direct current of the opposite polarity, and electrical apparatus controlled by said neutral relay.

15. In a track circuit for a coded cab signal system, including a source for supplying alternating current to said track circuit and also including coding means for periodically interrupting said current, the combination comprising, a transformer having a primary winding and a secondary winding, a primary circuit for energizing said primary winding from said source each time when current is supplied to said track circuit, means for passing current of only one polarity, a secondary circuit including the secondary winding of said transformer and said means for passing current of only one polarity, a direct current relay having two windings so connected with the primary winding of said transformer that one of said windings is energized by transient direct current of a given polarity each time said primary winding becomes energized by said primary circuit and the other is energized by transient direct current of the opposite polarity each time said primary circuit becomes deenergized, and a contact of said relay controlled to be closed by said transient direct currents of both polarities and included in said track circuit.

16. In traffic protection apparatus in which a stretch of railway track is divided into two sections insulated from each other, the combination comprising, a transformer having a primary winding connected across the rails of one of said sections and having a secondary winding connected across the rails of the other of said sections, an asymmetric unit also connected across the rails of said other section, a coding device, a source of alternating current connected across the rails of said one section, means controlled by said coding device for coding the current flowing from said secondary winding through said asymmetric unit and thereby producing transient direct current in said primary winding, and direct current means operated by said transient direct current.

17. In traffic protection apparatus in which a stretch of railway track is divided into two sections insulated from each other, the combination comprising, a transformer having a primary winding connected across the rails of one of said sections and having a secondary winding connected across the rails of the other of said sections, an asymmetric unit also connected across the rails of said other section, a coding device, a source of alternating current connected across the rails of said one section through a front contact of said coding device, means comprising a front contact of said coding device for coding the current flowing from said secondary winding through said asymmetric unit and thereby effecting the production of transient direct current in said primary winding, a direct current relay having two control windings, and means controlled by front and back contacts of said coding device for energizing one and then the other of said control windings respectively by said transient direct current.

18. In combination, a transformer having a primary winding and a secondary winding, an asymmetric unit, a secondary circuit including said secondary winding and said asymmetric unit, a source of alternating current energy, direct current means, a primary circuit for energizing said primary winding from said source, means for coding the direct current in said secondary circuit for producing transient direct current in said primary winding for operating said direct current means, means for obstructing the passage of said transient direct current from said primary winding through said source of alternating current energy, and an electrical device controlled by said direct current means.

PAUL N. MARTIN.

References Cited in the file of this patent

UNITED STATES PATENTS

| Number | Name | Date |
|---|---|---|
| 1,658,491 | Lucas | Feb. 7, 1928 |
| 1,683,222 | Williamson | Sept. 4, 1928 |
| 1,815,960 | Young | July 28, 1931 |
| 2,176,612 | Pflasterer | Oct. 17, 1939 |
| 2,211,174 | Shields et al. | Aug. 13, 1940 |
| 2,290,446 | Pflasterer | July 21, 1942 |
| 2,297,816 | Torkelson | Oct. 6, 1942 |
| 2,318,542 | Thompson | May 4, 1943 |
| 2,418,869 | Coley | Apr. 15, 1947 |

FOREIGN PATENTS

| Number | Country | Date |
|---|---|---|
| 562,524 | Germany | Oct. 26, 1932 |